Aug. 21, 1945.  V. J. SIGODA  2,383,020
DRESS OR SKIRT TRIMMING MECHANISM
Filed Jan. 17, 1941  4 Sheets-Sheet 1

INVENTOR.
VICTOR J. SIGODA
BY
ATTORNEY.

Aug. 21, 1945.    V. J. SIGODA    2,383,020
DRESS OR SKIRT TRIMMING MECHANISM
Filed Jan. 17, 1941    4 Sheets-Sheet 2
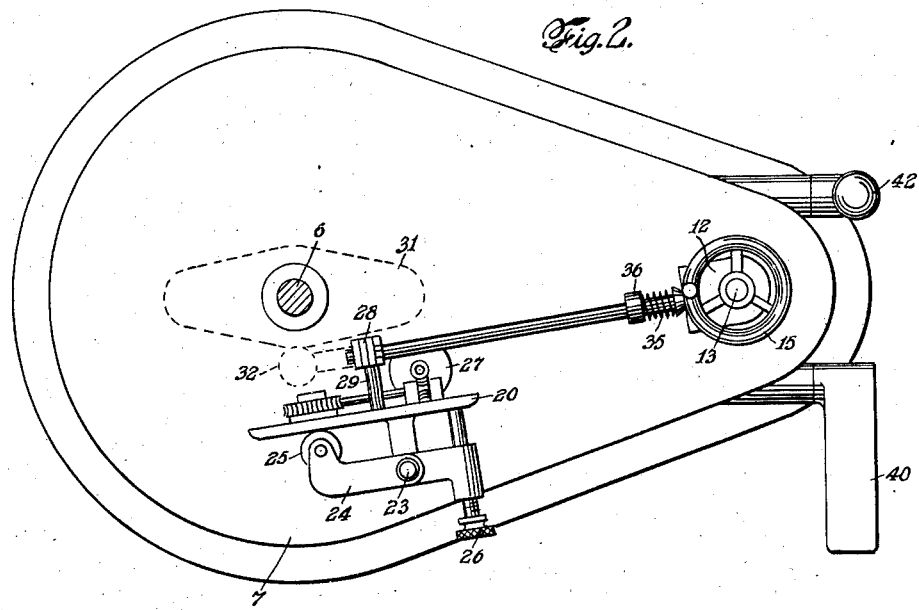
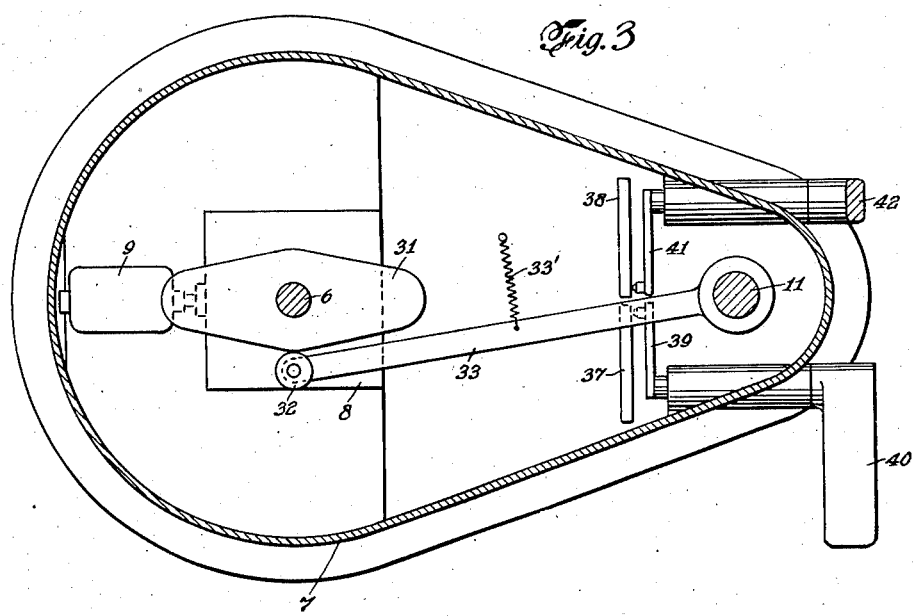
INVENTOR.
VICTOR J. SIGODA
BY
ATTORNEY.

Aug. 21, 1945.  V. J. SIGODA  2,383,020
DRESS OR SKIRT TRIMMING MECHANISM
Filed Jan. 17, 1941  4 Sheets-Sheet 3
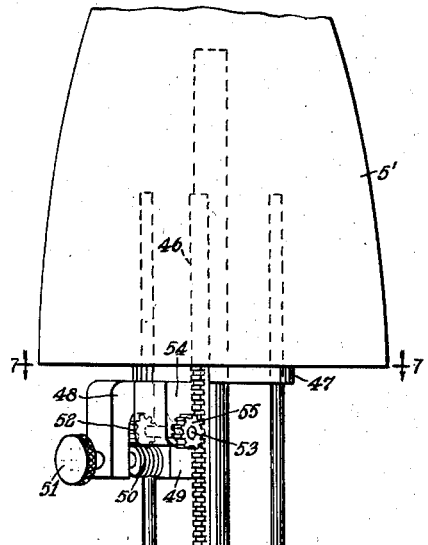
Fig. 4.
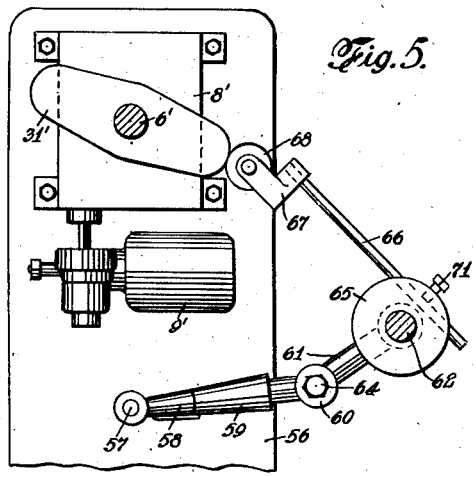
Fig. 5.
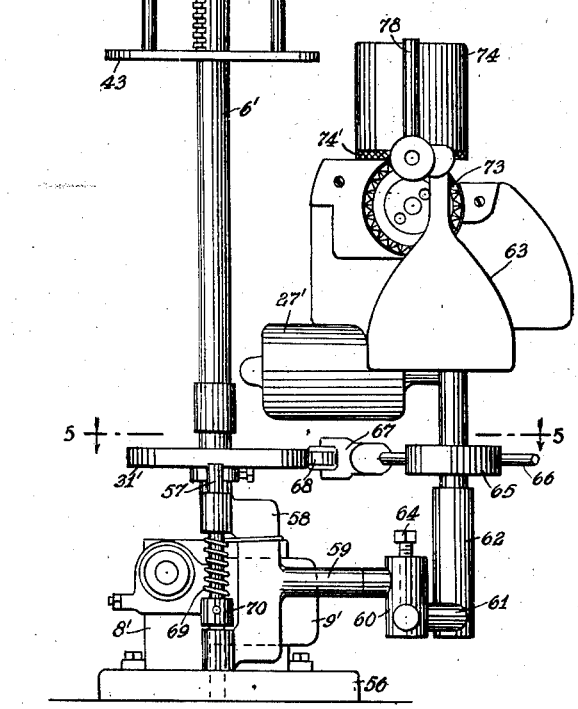
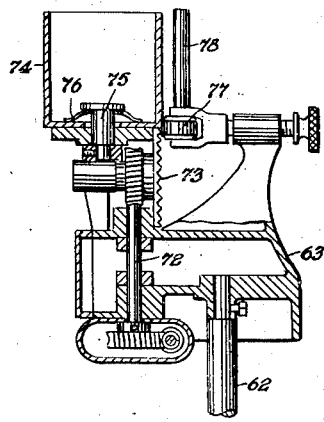
Fig. 6.
INVENTOR.
VICTOR J. SIGODA
ATTORNEY.

Aug. 21, 1945.　　　V. J. SIGODA　　　2,383,020
DRESS OR SKIRT TRIMMING MECHANISM
Filed Jan. 17, 1941　　　4 Sheets-Sheet 4
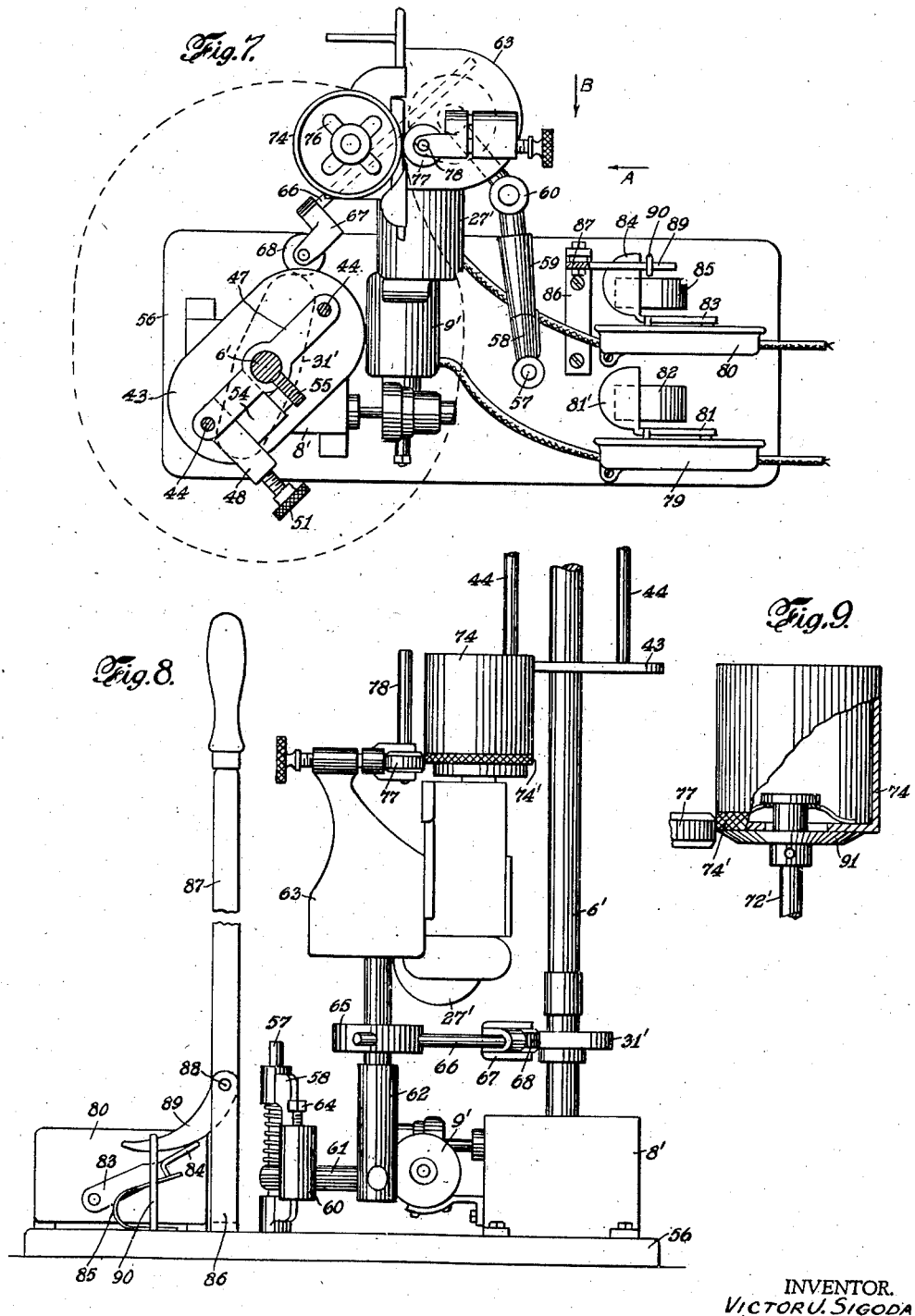
INVENTOR.
VICTOR U. SIGODA
BY
ATTORNEY.

Patented Aug. 21, 1945

2,383,020

UNITED STATES PATENT OFFICE 2,383,020

DRESS OR SKIRT TRIMMING MECHANISM

Victor J. Sigoda, Great Neck, N. Y., assignor to Man-Sew Pinking Attachment Corp., New York, N. Y., a corporation of New York Application January 17, 1941, Serial No. 374,889

28 Claims. (Cl. 164—71)

This invention relates to dress or skirt trimming mechanism and has for its general object and purpose to provide means, which may be operated and controlled with a minimum of manual effort or skill, for trimming the lower edge of a dress or skirt draped upon the person, or upon a form, so that its lower edge will be uniformly spaced a predetermined distance above the ground or floor after the skirt is trimmed.

It is another object of the invention to provide, in combination with a motor driven cutting or trimming knife, a vertically adjustable support for a form, separate motor driven means for rotating the same, and means for selectively controlling the speed of rotation of said support with respect to the rotatable trimming knife.

It is also a purpose of my invention to provide a mechanism of the above character which will be efficient and reliable in operation, and will eliminate the necessity of first marking the skirt at the desired distance above the floor and then removing the skirt from the person or form and cutting or trimming the same in accordance with such marking.

It is also an important novel feature of the invention to provide means for easily making various relative adjustments of the cutting or trimming unit with respect to the rotatable skirt supporting form, including means for radially shifting said trimming unit so that the edge of the skirt material moves through an elliptical path during the cutting cycle.

A further object of the invention is to provide means for operating the electrically driven cutting knife at selected speeds for the most effective cutting or trimming of the garment material in accordance with the design of the garment.

It is also a further object of the invention in one embodiment thereof, to provide means which will automatically and positively feed the garment material to the cutting or trimming knife.

With the above and other objects in view, the invention consists in the improved trimming mechanism for skirts or dresses and in the form, construction and relative arrangement of its several parts as will hereinafter be more fully described, illustrated in the accompanying drawings and subsequently incorporated in the subjoined claims.

In the drawings wherein I have illustrated several simple and practical embodiments of the invention, and in which similar reference characters designate corresponding parts throughout the several views:

Fig. 2 is a top plan view thereof.

Fig. 3 is a horizontal sectional view taken substantially on the line 3—3 of Fig. 1.

Fig. 4 is an elevation illustrating an alternative form of the invention, looking in the direction of the arrow A in Fig. 7, with certain of the parts omitted.

Fig. 5 is a detail horizontal sectional view taken on the line 5—5 of Fig. 4.

Fig. 6 is a detail vertical section showing the operating means for the cutting and feeding mechanism.

Fig. 7 is a horizontal section taken substantially on the line 7—7 of Fig. 4.

Fig. 8 is an elevation with certain of the parts omitted, looking in the direction indicated by the arrow B in Fig. 7, and Fig. 9 is a detail elevation partly in section showing an alternative form of the feeding and cutting device.

Figure 1:
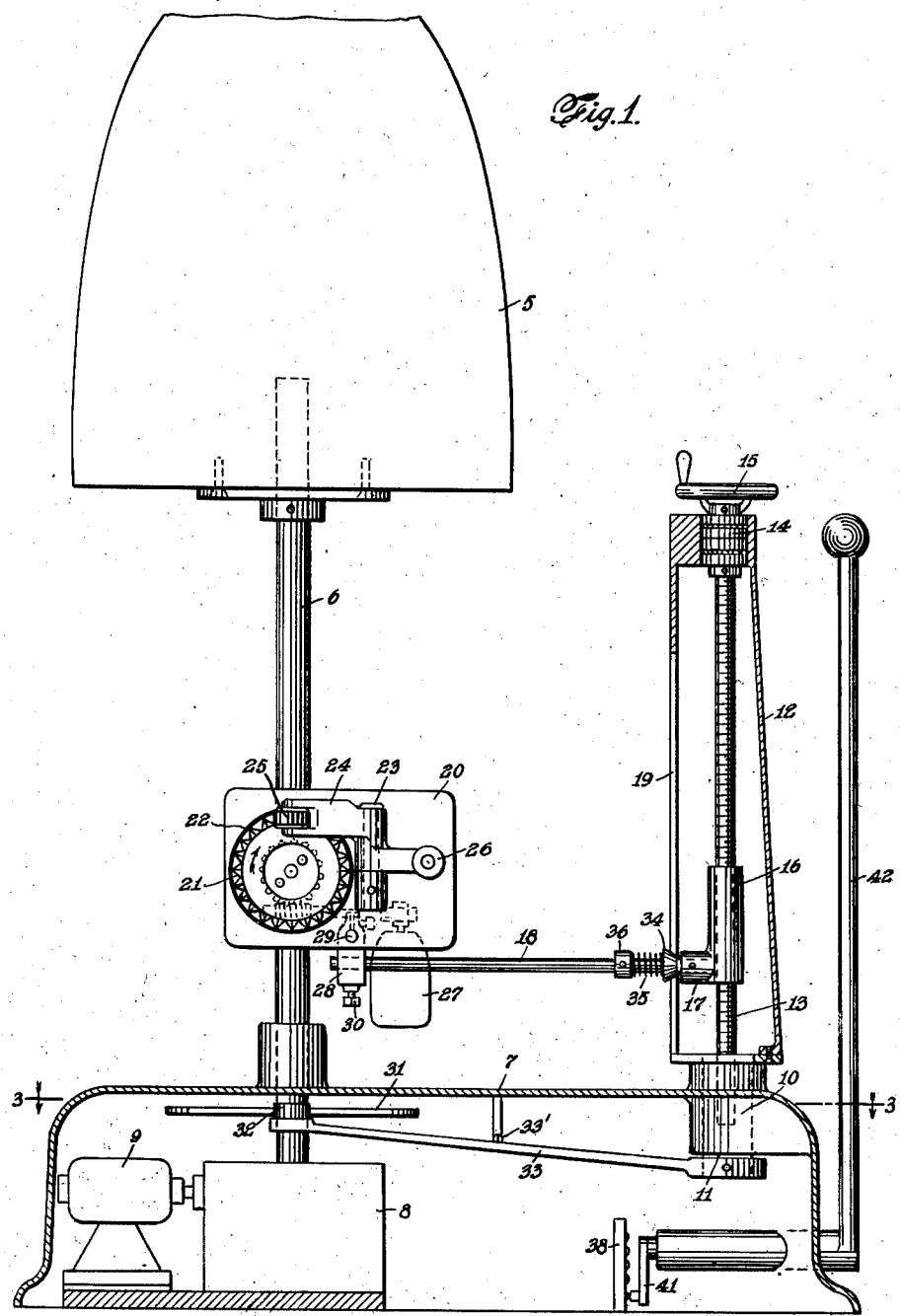
Fig. 1 is a side elevation partly in section showing one practical embodiment of the invention.

Referring in detail to the drawings, and for the present more particularly to Figs. 1 to 3 thereof, in one embodiment of the invention, I provide a form indicated at 5 upon which the dress or skirt is adapted to be draped. This form is suitably fixed to the upper end of a vertical shaft 6, the lower end of which is mounted in the housing 7 and operatively connected with suitable speed reduction gearing, generally indicated at 8, contained in said housing and driven by the electric motor 9.

The top wall of the housing 7 at one end thereof is provided with suitable bearing means 10 to rotatably receive a post or trunnion 11 provided upon the lower end of a vertically elongated casing 12. The lower end of adjusting screw or rod 13 is engaged in a bearing seat or bore formed in the post 11, and is mounted at its upper end in suitable bearing means 14 secured in the upper end of casing 12. Above this bearing means, a hand wheel or other manually operable member 15 is fixed to the end of said rod for conveniently rotating the same.

A sleeve 16 has threaded engagement on the rod 13 and at its lower end is formed with a laterally projecting part 17 to which one end of the horizontal rod 18 is suitably fixed, said rod extending through the vertical slot 19 and one side wall of the casing 12. Upon this rod, the cutting or trimming unit is adjustably carried.

The trimming unit embodies a base plate 20 having an opening therein to receive the cutting wheel or disk 21 mounted for rotation substantially in the plane of said base plate. In the present instance, I have shown this disk or wheel as having a serrated or toothed edge portion 22 for providing the garment with a pinked edge, though it will be understood that, as in the alternative embodiment of Fig. 9, the rotatable cutting wheel may have a continuous peripheral cutting edge for producing a straight line cut of the garment material.

On one side of the base plate 20 in parallel relation therewith, a pin or stud 23 is fixedly mounted and supports the pivotally rockable lever 24 in one end of which the pressure roller 25 is journaled to cooperate with the cutting edge of the disk or wheel 21 and press the garment material thereon. To the other end of said lever the adjusting screw 26 is connected, whereby the lever 24 may be rocked relative to the base 20 and the pressure of the roller 25 upon the garment material regulated as required.

Upon the opposite side of the base plate 20 a driving motor 27 for the cutting disk or wheel 21 is suitably mounted and has its shaft operatively connected with said cutter wheel by suitable gearing. The mounting and arrangement of the cutter wheel and the drive gearing therefor may be substantially the same as that disclosed in my pending application for patent Ser. No. 366,958 filed November 25, 1940 now Patent No. 2,295,610, issued September 15, 1942, so that further detail reference thereto is not required for the purposes of the present explanation.

The above described cutter unit is mounted upon the end of the rod 18 in adjacent relation to the rotatable shaft 6 by means of a suitable bracket member 28 fixed at one of its ends to the arm or lug 29 projecting from one side of the base plate 20 and extending below said base plate. The lower end of the bracket member is provided with an opening slidably receiving the rod 18 and carries the set screw 30, whereby said bracket may be securely fixed in its longitudinally adjusted position on said rod. Also said bracket may be rotatably adjusted on the rod 18 to position the plate 20 and cutter wheel 21 in a desired vertical plane with relation to the shaft 6 as may be found desirable in order to apply a certain pull or tension to the dress or skirt material during the cutting operation. To the lower end of the shaft 6 and within the housing 7 a cam plate 31 is fixed and peripherally coacts with a suitable roller 32 mounted on one end of a lever 33, the other end of which is fixed to the lower end of the post or trunnion 11. A spring indicated at 33' maintains the roller 32 in contact with the cam 31 and yieldingly resists relative movement of the lever 33. It will thus be understood that as the shaft 6 and the dress supporting form 5 are rotated, an oscillating motion is transmitted by the cam plate 31 and lever 33 to the vertical casing 12 so that the cutting or trimming unit is bodily moved radially with respect to the axis of the shaft 6. Thus the cutting unit is automatically positioned as required by the width or fullness of the garment so as to obtain an accurate and continuous even cut throughout the lower edge of the dress or skirt.

Preferably, I provide a sliding tapered collar 34 on the rod 18. This collar is urged into frictional binding contact against the edges of the slot 19 in the wall of the casing 12 by the spring 35 interposed between said collar and collar 36 which is fixed to the rod 18. This provides sufficient resistance to any casual shifting movement of the sleeve 16 in the oscillating motion of the casing 12 so that the vertically adjusted position of the cutting or trimming unit will not be altered.

For the further accurate control of the cutting or trimming action, I preferably provide separate rheostats for the motors 9 and 27 which are conventionally indicated at 37 and 38 respectively. The contact arm 39 for the rheostat 37 is adjusted by means of the foot operated treadle 40, while the arm 41 associated with rheostat 38 is adjusted by means of the vertically positioned hand operated lever 42. By making the proper adjustments of the respective rheostats, the supply of current to the respective motors 9 and 27 may be controlled to thereby operate the rotatable dress supporting form 5 and the cutter wheel 21 of the trimming unit at selected speeds. This is a desirable provision to properly trim garments of varying designs particularly dresses which may be provided with numerous pleats or folds.

In the operation of the machine as above described, it will be understood that the trimming or cutting unit is first vertically adjusted relative to the floor surface by the operation of the adjusting rod 13 to raise or lower the sleeve 16 and rod 18 so that the point of contact of the pressure roller 25 with the cutting edge of the wheel 21 will be located at the required predetermined distance above the floor surface in accordance with the desired length of the skirt. When the skirt is draped upon the form 5, its lower edge portion is passed downwardly between the pressure roller 25 and the cutter wheel 21. When the motors 9 and 27 are energized, as the form 5 with the garment thereon is slowly rotated, the cutter wheel 21 is driven at the selected speed. In accordance with the cut or fullness of the skirt or dress, as the cutting or trimming action proceeds, the trimming unit is also moved radially by the cam 31 and lever 33 as above explained. This insures a smooth and uniformly continuous movement of the fabric material between the pressure roller and the cutter wheel so that an even straight cut is obtained around the entire lower edge of the garment at a uniformly spaced vertical distance above the floor surface.

In Figs. 4 to 8 of the drawings I have illustrated an alternative embodiment of the invention, in which the rotatable perpendicular shaft 6' is driven by the motor 9' through speed reduction gearing 8', as in the construction first described. In this case, however, the dress or skirt supporting form 5' is vertically more readily adjustable relative to the shaft 6'. For this purpose, I provide upon the said shaft, intermediate of its ends the fixed plate 43 to which the lower ends of a plurality of relatively spaced vertical rods 44 are fixed, said rods constituting guides for the form 5' extending upwardly into suitable bores provided in said form. The upper end of the shaft 6' also rotates freely in a central bore in the form 5'. The lower end of a vertical rack 45 is also fixed to the plate 43, the form 5' having a vertically extending chamber or bore 46 to receive the upper end portion of this rack.

To the lower end face of the form 5' the elongated metal bar 47 is suitably fixed and is provided at one of its ends with an angularly projecting lug terminating in a depending part as indicated at 48. In spaced relation thereto, said lug is also formed with a second depending part 49. These parts 48 and 49 of the plate 47 provide bearings for a worm 50 adapted to be manually operated by a suitable finger piece 51 to one end of the worm shaft. This worm 50 is in constant mesh with a worm gear 52 on one end of a shaft 53 journaled in the lug 54 on the plate 47. To the other end of said shaft the pinion 55 is fixed, and has meshing engagement with the teeth of the rack 45. It will thus be apparent that by the operation of the worm 50, the dress supporting form 5' may be raised or lowered along the shaft 6'. Of course, since the guide rods 44 and rack 45 have a fixed relation to the shaft 6' in the rotation of said shaft, the form 5' will also be rotated.

In the base 56 of the machine the lower end of a short vertical rod 57 is suitably fixed. Upon this rod, the vertically spaced ends of a forked member 58 are rotatably engaged, said member being formed centrally thereof with a laterally extending arm 59 terminating in a bearing 50. This bearing receives the rotatably adjustable horizontal rod 61 projecting laterally from the lower end of the vertically disposed supporting pedestal 62 for the cutting or trimming unit generally indicated at 63. The rod 61 is rigidly secured in a fixed position relative to the bearing 60 by means of the set screw 64.

Upon the supporting pedestal 62 a collar 65 is fixed having a bore or opening extending horizontally therethrough to adjustably receive the rod 66 on one end of which the bearing fork 67 for a roller 68 is carried. This roller is yieldingly held in engagement with the periphery of the cam 31' on the shaft 6' by means of the springs 69, preferably arranged upon the rod 57 and attached at one of its ends to the collar 70 on said rod and having its other end engaged with the member 58. Thus this spring constantly tends to move the member 58 and the parts supported thereby, including the cutting unit inwardly towards the shaft 6'. The cutting or trimming unit may be initially adjusted or set in operative relation to the rotating form 5', as may be found desirable for skirts or dresses of different designs, by adjusting the position of the roller 68 relative to the supporting pedestal or standard 62 and securing the same in such adjusted position by the set screw indicated at 71 which has binding engagement against the rod 66.

The cutting or trimming unit includes the operating motor 27' which operates the vertically positioned shaft 72 through suitable worm gearing to drive the vertically positioned cutter wheel or disk 73. In this case, I use a feed means in addition to the feed of the garment by rotating the form for feeding the fabric material to the cutter wheel, which is quite similar to that shown in my pending application above referred to and includes the eccentrically shiftable feeding member 74 suitably mounted for rotation about a vertical axis 75 and in tangential relation to the cutting wheel 73. In this instance said feeding member is in the form of a cylinder, the base wall of which is engaged by suitable spring means indicated at 76 to urge said wall into frictional contact with the peripheral face of the cutting wheel 73 so that rotation is transmitted from said wheel to the feeding member. The pressure roller 77 is adjustably mounted as disclosed in said pending application to urge the fabric material against the cutting edge of the wheel 73 and against the knurled outer surface 74' of the cylinder 74. Of course, the spring means 76 yieldingly resists eccentric shifting movement of the cylinder with respect to its axis 75. To the bearing yoke for the roller 77 an upstanding pin or rod 78 is fixed, and in conjunction with the adjacent wall of the cylinder 74 provides guide means for the lower edge of the dress or skirt to direct the same between said cylinder and the pressure roller 77.

In this form of the invention, I also provide the current control rheostats 79 and 80 respectively for the motors 9' and 27' whereby the dress supporting form 5' and the cutter disk or wheel 73 may be operated at selected relative speeds. The movable contact operating arm 81 of the rheostat 79 is provided at one of its ends with the treadle plate 81' which is adapted to be depressed by the foot of the operator in opposition to a leaf spring indicated at 82.

Similarly, the operating arm 83 of the rheostat 80 is provided with the plate 84 at one end and is yieldingly urged to its normal position by the leaf spring 85. Adjacent thereto a vertical bracket member 86 is fixed to the base 56 and on the upper end thereof a hand operated lever 87 is fulcrumed near its lower end as at 88. This lever is provided with a laterally curved end portion 89 below the pivot 88 which is engaged in a guide loop provided upon the upper end of a rod 90, the lower end of which is fixed to the base 56. The lower convex edge of the portion 89 of said lever has bearing contact upon the plate 84. Thus it will be understood that when the lever 87 is moved to the left from the position illustrated in Fig. 8 of the drawings, the rheostat arm 83 is depressed against the resistance of the spring 85 to regulate the supply of current to the motor 27'.

In Fig. 7 of the drawings, I have shown in dotted lines the approximate contour of the skirt or dress supported on the form 5' as its lower edge is continuously fed between the feed member or cylinder 74 and the pressure roller 77 to the knife edge of the cutting disk or wheel 73. By the operation of the rheostats 79 and 80 the speed of rotation of the dress form 5' and of the cutting knife 73 may be selectively controlled and relatively varied, as may produce the most efficient cutting or trimming action for skirts or dresses, the design of which requires greater or less amounts of fabric material. The cam means 31' for automatically shifting the cutting and feeding unit outwardly and inwardly relative to the rotating form 5' insures the uniformly smooth and accurate cut of the lower edge of the dress so that all parts of the dress edge will be spaced at precisely the same distance above the floor surface, in accordance with the vertical setting or adjustment of the form 5'. When it is necessary in operating upon certain dress materials to place a certain amount of vertical tension upon the fabric during the cutting action, this may be readily done by loosening set screws 64 and rocking the rod 61 in the bearing 60 to slightly tilt the supporting standard 62 and the trimming unit outwardly away from the shaft 6' so that the point of cut of the rotating knife 73 is slightly lowered, thus causing a drag or pull upon the fabric. The set screw 64 is then tightened securely against the rod 61 to hold the trimming unit in such adjusted position.

In Fig. 9 of the drawings I have shown a slightly modified form of the cutting and feeding mechanism, in which the cutting disk or knife 91 rotating in a horizontal plane is fixed to the upper end of the shaft 72'. The eccentrically shiftable feed member or cylinder 74 is yieldingly held at its base in engagement with the upper face of said cutting disk in the same manner as shown in Fig. 6 of the drawings so that, in accordance with the thickness of the material being fed to the knife blade 91, said feeding member or cylinder may eccentrically shift relative to the cutting edge of the blade, and thus insure the maintenance of a proper feeding pressure of the material against the cooperating face of the feed roller 77.

From the foregoing description considered in connection with the accompanying drawings, the construction, manner of operation and several advantages of the described embodiments of the invention will be clearly understood. Practical tests of these machines have demonstrated that in the operation thereof, the dress or skirt will be quickly and accurately cut or trimmed at its lower edge so that, upon the body of the wearer, it will be uniformly spaced for the predetermined distance above the ground or floor surface. The proper operation and control of the trimming mechanism also requires but little manual effort or skill and enables the dress manufacturer to accurately and expeditiously execute such trimming operations without previous marking of the desired skirt length on the fabric material. While I have herein shown and described embodiments of my present invention, which I believe to be admirably designed for the purpose in view, it is nevertheless to be understood that such disclosure, as to many of the mechanical features of the machine, is more or less illustrative, and therefore susceptible of embodiment in other alternative structural forms. Accordingly, it is to be understood that in the further development of the present invention I reserve the privilege of resorting to all such changes in the form, construction and relative arrangement of the several parts as may fairly be comprehended within the spirit and scope of the appended claims.

I claim:

1. In combination, a rotatable dress supporting unit and operating means therefor, a trimming unit having a rotatable cutter and operating means therefor, and means for selectively controlling the relative speeds of rotation of said dress supporting unit and the trimming cutter.

2. In combination, a rotatable dress supporting unit and operating means therefor, a trimming unit having a rotatable cutter and operating means therefor, means for bodily adjusting one of the said units vertically relative to the other to position the cutter in predetermined position with respect to the lower edge of the dress, and means for selectively controlling the relative speeds of rotation of said dress supporting unit and the trimming cutter.

3. In combination, a rotatable dress supporting unit and operating means therefor, a trimming unit having a rotatable cutter and operating means therefor, and means operable in the rotation of said supporting unit for bodily moving the trimming unit to variously position the trimming cutter radially with respect to the axis of said supporting unit.

4. In combination, a rotatable dress supporting unit and operating means therefor, a trimming unit having a rotatable cutter and operating means therefor, means operable in the rotation of said supporting unit for bodily moving the trimming unit to variously position the trimming cutter radially with respect to the axis of said supporting unit, and means for selectively controlling the relative speeds of rotation of said dress supporting unit and the trimming cutter.

5. In combination, a dress supporting unit and a rotatably mounted operating shaft therefor, a trimming unit having a rotatable cutter and operating means therefor, and means for variably positioning the trimming unit radially with respect to the axis of said operating shaft, including a cam member fixed to said shaft.

6. In combination, a dress supporting unit and a rotatably mounted operating shaft therefor, a trimming unit having a rotatable cutter, a member supporting said trimming unit independently of said dress supporting unit, and means for bodily moving said trimming unit and its support relative to the dress supporting unit to variably position the trimming cutter radially with respect to the latter unit, said adjusting means including a cam member fixed to the operating shaft for the dress supporting unit.

7. In combination, a dress supporting unit and rotatably mounted operating shaft therefor, a trimming unit having a rotatable cutter, a member supporting said trimming unit independently of said dress supporting unit, means for angularly adjusting said trimming unit relative to the axis of rotation of the dress supporting unit, and means for bodily moving said trimming unit and its support relative to the dress supporting unit to variably position the trimming cutter radially with respect to the latter unit, said latter means including a cam member fixed to the operating shaft for the dress supporting unit.

8. In combination, a rotatable dress support and operating shaft therefor, a trimming unit having a rotatable cutter and operating means therefor, means for vertically adjusting said trimming unit relative to the dress support, and means including a member connected with the operating shaft for the dress support to automatically bodily vary the position of the trimming unit radially of the dress support during the rotation of the latter.

9. In combination, a rotatable dress support and vertically positioned operating shaft therefor, a driving motor for said shaft, a trimming unit having a rotatable cutter and operating motor therefor, a support for said trimming unit, and means for vertically adjusting said support and unit relative to the dress support, and means for bodily adjusting said support and trimming unit radially with respect to the dress support, including a cam member fixed to the operating shaft for said dress support.

10. In combination, a rotatable dress support and vertically positioned operating shaft therefor, a driving motor for said shaft, a trimming unit having a rotatable cutter and operating motor therefor, a support for said trimming unit, means for vertically adjusting said support and unit relative to the dress support, means for bodily adjusting said support and trimming unit radially with respect to the dress support, including a cam member fixed to the operating shaft for said dress support, and means for independently controlling the operation of the motors for the dress support and trimming unit to rotate said support and the trimming cutter at variable selected speeds.

11. In combination, a base housing, a rotatable dress support and operating means therefor in one end of the housing, a vertically disposed casing rotatably mounted on the other end of the housing, a support extending laterally from said casing, a trimming unit carried by the support, means within said casing for vertically adjusting said support and the trimming unit relative to the dress support, and means within said housing automatically operated in the rotation of the dress support to rotate said casing relative to the housing and variably position said trimming unit and its support radially with respect to the axis of said rotatable dress support.

12. In combination, a base housing, a rotatable dress support and operating means therefor mounted in one end of said housing, a vertically disposed casing rotatably mounted on the other end of the housing, a supporting member extending laterally from the casing, a trimming unit having a rotatable cutter and means for adjustably mounting said unit on the supporting member to position said cutter in a predetermined operating plane with respect to the axis of said dress support, manually operable means for vertically adjusting said supporting member and trimming unit relative to said casing and the dress support, and means in said base housing including a part operatively connected with a part of the operating means with the dress support to rotate said casing and position said supporting member and trimming unit in variably spaced radial relation to the axis of the dress support.

13. In combination, a dress support rotatable about a vertical axis and operating means therefor, a trimming unit having a rotatable cutter and operating means therefor, means for adjustably mounting said unit to position said rotatable cutter in various planes of operation relative to the axis of the dress support, and manually operable means for controlling the rotation of the dress support and said trimming cutter.

14. In combination with a dress support rotatable about a vertical axis and operating means therefor, a trimming unit having a rotatable cutter and operating means therefor, means for adjustably mounting said unit to position said cutter in various planes of operation relative to the axis of said dress support, and manually operable means for controlling the operating means for said dress support and trimming cutter to rotate the same at selected relative speeds.

15. A garment trimming machine comprising in combination a support for a garment, means to rotate said support around its axis, a rotating cutting member, and means for directing the garment fabric into engagement with said rotating cutter during the rotation of said support.

16. A garment trimming machine comprising in combination a support for a garment, means to rotate said support around its axis, a rotating cutting member, and means to engage the bottom of said garment and feed it to said cutting member.

17. In a garment trimming machine, a rotatably mounted garment support, a rotary cutting means vertically movable as a unit relative to said support, power operated means for actuating said cutting means, and manually operable means for vertically moving and positioning said cutting means to establish a definite horizontal cutting plane relative to the lower edge of the garment during rotation of said support.

18. In a garment trimming machine, the combination of means to support a garment, cutting means to trim the nether edge of the garment, means to actuate said cutting means, means to revolve said garment supporting means, and means to vertically move said cutting means as a unit relative to said supporting means and position the same in vertically spaced relation thereto to establish a definite horizontal cutting plane with respect to the lower edge of the garment during rotation of supporting means.

19. In a garment trimming machine, a rotatably mounted garment support, rotary cutting means vertically movable as a unit relative to said support, power operated means for actuating said cutting means, manually operable means for vertically moving and positioning said cutting means to establish a definite horizontal cutting plane relative to the lower edge of the garment during rotation of said support, and means operable independently of said last named means to control the operation of said power operated actuating means.

20. In a garment trimming machine, a rotatable dress supporting unit, a trimming unit having a rotatable cutter, means for operating said supporting and trimming units, means for bodily adjusting one of said units relative to the other to dispose the cutter in predetermined position with respect to the lower edge of the dress, and means operable independently of said last named means to control the operating means for said dress supporting and trimming units.

21. In a garment trimming machine, means to support a garment, rotatable cutting means to trim the nether edge of the garment, means to actuate said cutting means including a motor and drive gearing for said cutting means, and means to vertically adjust said cutting means and its drive gearing as a unit relative to the garment supporting means while maintaining operative connection between said gearing and the motor.

22. In a garment trimming machine, a rotatable garment support, a cutting station, co-acting parts one of which is manually operable to move one of said parts relative to the other axially of the garment support, and means connecting said movable part in load sustaining relation with the garment support to vertically adjust the position of said support relative to said cutting station.

23. In a garment trimming machine, a garment support, a cutting station, and manually operable means mounted below said garment support including co-acting members one of which is rotatable relative to the other, whereby rectilinear bodily movement is imparted to one of said members, and means connecting the latter member with said support to vertically adjust the position of the support relative to the cutting station upon operation of said first named means.

24. In a garment trimming machine of the character described, in combination means to support a garment, means to revolve said garment supporting means, a cutting station, and means comprising a rack and pinion to move said garment supporting means vertically relative to said cutting station.

25. In a garment trimming machine, the combination of means to support a garment, cutting means to trim the garment, means to actuate said cutting means and revolve the garment supporting means, and manually operable means to effect relative bodily movement between said garment supporting means and cutting means and establish a desired operating position of said cutting means with respect to the garment.

26. In a garment trimming machine, the combination of means to support a garment, cutting means to trim the garment, means to actuate said cutting means and revolve the garment supporting means, manually operable means to effect relative bodily movement between said garment supporting means and cutting means and establish a desired operating position of said cutting means with respect to the garment, and means controlling the effective operation of said actuating means in the latter position of said cutting means.

27. In a garment trimming machine, a rotatable dress supporting unit, a trimming unit having a rotatable cutter, means for operating said supporting and trimming units, and means for vertically adjusting one of said units relative to the other to dispose the cutter in predetermined relation to the lower edge of the dress, while maintaining an operative connection between each of said units and said operating means.

28. In a garment trimming machine, a rotatable dress supporting unit, a trimming unit having a rotatable cutter, means for operating said supporting and trimming units, means for vertically adjusting one of said units relative to the other to dispose the cutter in predetermined relation to the lower edge of the dress, while maintaining an operative connection between each of said units and said operating means, and means for controlling the effective operation of said operating means.

VICTOR J. SIGODA.